(12) United States Patent
Brooks

(10) Patent No.: US 6,928,181 B2
(45) Date of Patent: Aug. 9, 2005

(54) METHOD AND SYSTEM FOR BIOMETRIC RECOGNITION USING UNIQUE INTERNAL DISTINGUISHING CHARACTERISTICS

(75) Inventor: Juliana H. J. Brooks, Columbus, OH (US)

(73) Assignee: Berkshire Labs, Havre de Grace, MD (US)

(*) Notice: Subject to any disclaimer, the term of this patent is extended or adjusted under 35 U.S.C. 154(b) by 0 days.

(21) Appl. No.: 10/696,211

(22) Filed: Oct. 29, 2003

(65) Prior Publication Data

US 2004/0052406 A1 Mar. 18, 2004

Related U.S. Application Data

(63) Continuation of application No. 08/974,781, filed on Nov. 20, 1997, now abandoned.

(51) Int. Cl.[7] ............................................. G06K 9/00
(52) U.S. Cl. ....................... 382/115; 340/5.82; 600/443
(58) Field of Search .............................. 382/115, 124, 382/207, 181, 218; 600/407, 445, 437, 443, 446; 235/380, 492; 704/246, 273; 283/68; 356/71; 340/5.1, 5.52, 5.53, 5.8, 5.81, 5.82, 5.83; 902/3, 4, 25

(56) References Cited

U.S. PATENT DOCUMENTS

| | | | | |
|---|---|---|---|---|
| 3,872,443 A | * | 3/1975 | Ott | 600/587 |
| 3,990,436 A | * | 11/1976 | Ott | 600/407 |
| 4,048,986 A | * | 9/1977 | Ott | 600/407 |
| 4,107,775 A | * | 8/1978 | Ott | 382/115 |
| 5,197,475 A | * | 3/1993 | Antich et al. | 600/437 |
| 5,454,045 A | * | 9/1995 | Perkins et al. | 382/181 |
| 5,456,256 A | * | 10/1995 | Schneider et al. | 600/445 |
| 5,587,533 A | * | 12/1996 | Schneider et al. | 73/614 |
| 5,647,364 A | * | 7/1997 | Schneider et al. | 600/445 |
| 5,717,776 A | * | 2/1998 | Watanabe | 382/116 |
| 5,787,187 A | * | 7/1998 | Bouchard et al. | 382/115 |

FOREIGN PATENT DOCUMENTS

EP          197810          * 10/1986

* cited by examiner

Primary Examiner—Samir Ahmed
(74) Attorney, Agent, or Firm—Mark G. Mortenson

(57) ABSTRACT

The present invention is a biometric recognition method and system for identifying humans and animals with acoustic scanning techniques. The invention is based upon transmitting acoustic energy through an external accessible surface to non-visible internal tissue having a unique distinguishing characteristic. A master representative pattern of the unique distinguishing characteristic is produced by the interaction of an acoustic energy beam with discontinuities and inhomogeneities within the non-visible internal tissue. The master representative pattern is used for reference and compared to a current representative pattern formed upon each attempted reentry into the system.

47 Claims, 4 Drawing Sheets

METHOD AND SYSTEM FOR BIOMETRIC RECOGNITION USING UNIQUE INTERNAL DISTINGUISHING CHARACTERISTICS

This application is a Continuation of application Ser. No. 08/974,781, filed Nov. 20, 1997, now abandoned.

TECHNICAL FIELD

This invention relates to biometric recognition methods and systems for identification of a person or animal using non-visible internal-tissue having a unique distinguishing characteristic.

BACKGROUND OF THE INVENTION

Security methods based on memory data encoded into magnetic cards such as personal identification numbers or passwords are widely used in today's business, industrial, and governmental communities. With the increase in electronic transactions and verification there has also been an increase in lost or stolen cards, and forgotten, shared, or observed identification numbers or passwords. Because the magnetic cards offer little security against fraud or theft there has been a movement towards developing more secure methods of automated recognition based on unique, externally detectable, personal physical anatomic characteristics such as fingerprints and retina prints, or external behavior characteristics; for example, writing style and voice patterns. Known as biometrics, such techniques are effective in increasing the reliability of recognition systems by identifying a person by characteristics that are unique to that individual. Some representative techniques include fingerprint recognition focusing on external personal skin patterns, hand geometry concentrating on personal hand shape and dimensions, retina scanning defining a person's unique blood vessel arrangement in the retina of the eye, voice verification distinguishing an individual's distinct sound waves, and signature verification.

Biometric recognition can be used in "identification mode", where the biometric system identifies a person from the entire enrolled population by searching a database for a match. A system can also be used in "verification mode", where the biometric system authenticates a person's claimed identity from his/her previously enrolled pattern of identification data. In many biometric applications there is little margin for any inaccuracy in either the identification mode or the verification mode. These applications may include physical access to restricted areas; and access to computer systems containing sensitive information used by the military services, intelligence agencies, and other security-critical Federal organizations. Also, there are law enforcement applications which include home incarceration, parole programs, and physical access into jails or prisons. Finally, government sponsored entitlement programs that rely on the Automated Fingerprint Identification System (AFIS) for access are important to deter fraud in social service programs by reducing duplicate benefits or even continued benefits after a recipient's demise.

With the advancement of lasers and synthetic polymers there is currently available technology to reproduce a human body part with the requisite unique physical patterns and traits of a particular individual. In high level security systems, where presentation of a unique skin or body pattern needs to be verified for entry, a counterfeit model could be produced, thereby allowing unauthorized entry into a secured facility by an imposter. As these capabilities evolve and expand, thereby providing more realistic body parts with unique skin patterns or specific geometries, there is a greater need to verify whether the body part offered for identification purposes is a counterfeit reproduction or even a body part of a deceased authorized individual.

Current commercially available biometric methods and systems use only externally visible distinguishing characteristics for identification; for example, fingerprints, hand geometry and blood vessel patterns. To date, the most widely used method is fingerprinting but there are several problems which have been encountered including false negative identifications due to dirt, moisture and grease on the print being scanned. Additionally, some individuals have insufficient detail of the ridge pattern on their print due to trauma or a wearing down of the ridge structure. To overcome these problems, biometric methods have been introduced using ultrasonic technology to scan the subsurface features of the fingerprint ridge pattern which contain all of the features that the surface skin displays. However, this method does not provide a fail proof system because a fingerprint, both the surface and subsurface ridge pattern, can be easily reproduced with today's modern technology.

To increase security, attempts have been made to use internal implants which comprise a coded computer chip to identify a person or animal. Some of these internal implants have been used in tagging animals, especially if the animals are highly valued; for example, a prize bull, expensive breeding stock, race horses and even family pets. But, even these implants are not without risk. These implants may be helpful in identifying an animal but only if the implants have not been removed. Once removed there is no discernible information to identify a lost or stolen animal. Furthermore, if internal implants are used for access into a secure facility it would be relatively easy to remove the implanted chip from an authorized individual, and subsequently implant the chip into an unauthorized individual.

Accordingly, there is a need for more economic and reliable automated biometric recognition methods and systems which verify the identity of an individual or animal using unique characteristics that are not readily removed or replicated. This would eliminate concerns regarding the removal of an internal implant, fingerprints that are unidentifiable due to dirt, grease, moisture or external surface deterioration, and the possibility of deceiving a system with an artificial reproduction of a unique distinguishing characteristic used for identification.

SUMMARY OF INVENTION TERMS

For purposes of this invention, the terms and expressions below, appearing in the Specification and Claims are intended to have the following meanings:

"Non-visible internal tissue" means internal tissue of a body, either animal or human that is not visible to the human eye from an external viewing of or through the outer integument including: skeletal tissue, fat deposits, cartilage, organs, muscle tissue, soft tissue, blood vessels, and nervous system tissue.

"Unique distinguishing characteristic" means a characteristic of a human or animal that is unique to said individual or animal and can be used to identify the same. This characteristic may include surface features of non-visible internal tissue, geometry of non-visible internal tissue, physical and mechanical properties of non-visible internal tissue and combinations thereof.

"Representative pattern" means a pattern that is formed by emitted acoustic waves after interaction with discontinuities or inhomogeneities within the internal tissue and is representative of the unique distinguishing characteristic.

"Substantially stable" means that the unique distinguishing characteristic will not be altered significantly under normal unstressed conditions.

The present invention relates to biometric recognition methods and systems using acoustic energy for verifying the identity of a human or animal by the recognition of non-visible internal tissue having a substantially stable unique distinguishing characteristic.

The method comprises generating an electrical oscillating signal. The electrical oscillating signal is converted to an acoustic energy beam. The acoustic energy beam is transmitted through an external accessible surface to the non-visible internal tissue. In response to the penetration of the acoustic energy beam into the non-visible internal tissue, an acoustic energy beam is emitted from the internal tissue, wherein the emitted acoustic energy beam has been altered by interaction with discontinuities and inhomogeneities therein. The emitted acoustic energy beam is converted to an emitted electrical signal. A current representative pattern of the substantially stable unique distinguishing characteristic in the non-visible internal tissue is formed in response to the emitted electrical signal. The current representative pattern is compared with a previously produced and stored master representative pattern to determine if the individual is recognized by the biometric system.

Converting the electrical oscillating signal into an acoustic energy beam and transmitting the acoustic energy beam through the external accessible surface can be performed by a transmitting transducer. Similarly, receiving and converting the emitted acoustic energy beam into the emitted electrical signal can be performed by a receiving transducer.

This method may be practiced by having an archival master representative pattern stored in at least one memory storage system to be accessed later for a comparison with a current representative pattern. Also, this method may rely on the current representative pattern replacing the master representative pattern after at least one pass through the recognition system.

It is a further object of this present invention to provide a new non-invasive biometric recognition system for verifying an individual by scanning non-visible internal tissue using an acoustic energy beam. The system can include a means for generating an electrical oscillating signal. After the signal is generated, at least one means for converting the electrical signal to an acoustic energy beam is connected to the means of generating an electrical signal. The acoustic energy beam is transmitted from the converting means through an external accessible surface to the non-visible internal tissue. The transmitting acoustic energy beam is altered by interaction with discontinuities and inhomogeneities within the non-visible internal tissue before being emitted as an emitted acoustic energy beam. At least one means for converting the emitted acoustic beam into an emitted electrical signal receives the emitted acoustic energy beam and converts it to the emitted electrical signal. A means for forming a current representative pattern is connected to the means for receiving and converting the emitted acoustic energy beam, wherein the emitted electrical signal is transformed into a current representative pattern of the substantially stable unique distinguishing characteristic. A means for comparing is connected to the means for forming the current representative pattern, wherein a previously produced and stored master representative pattern is compared to the current representative pattern.

Additionally, the means for converting the electrical oscillating signal to the acoustic energy beam and the means for transmitting the acoustic energy beam through the external accessible surface can be at least one transmitting transducer. Likewise, the means for receiving the emitted acoustic energy beam and converting the emitted acoustic energy beam into the emitted electrical signal can be at least one receiving transducer. The transmitting transducer and the receiving transducer can be one and the same transducer. The transmitting and receiving transducers can be held adjacent to the external accessible surface by a holder, wherein the transducers are placed.

DESCRIPTION OF THE PREFERRED EMBODIMENTS

Figure 1:
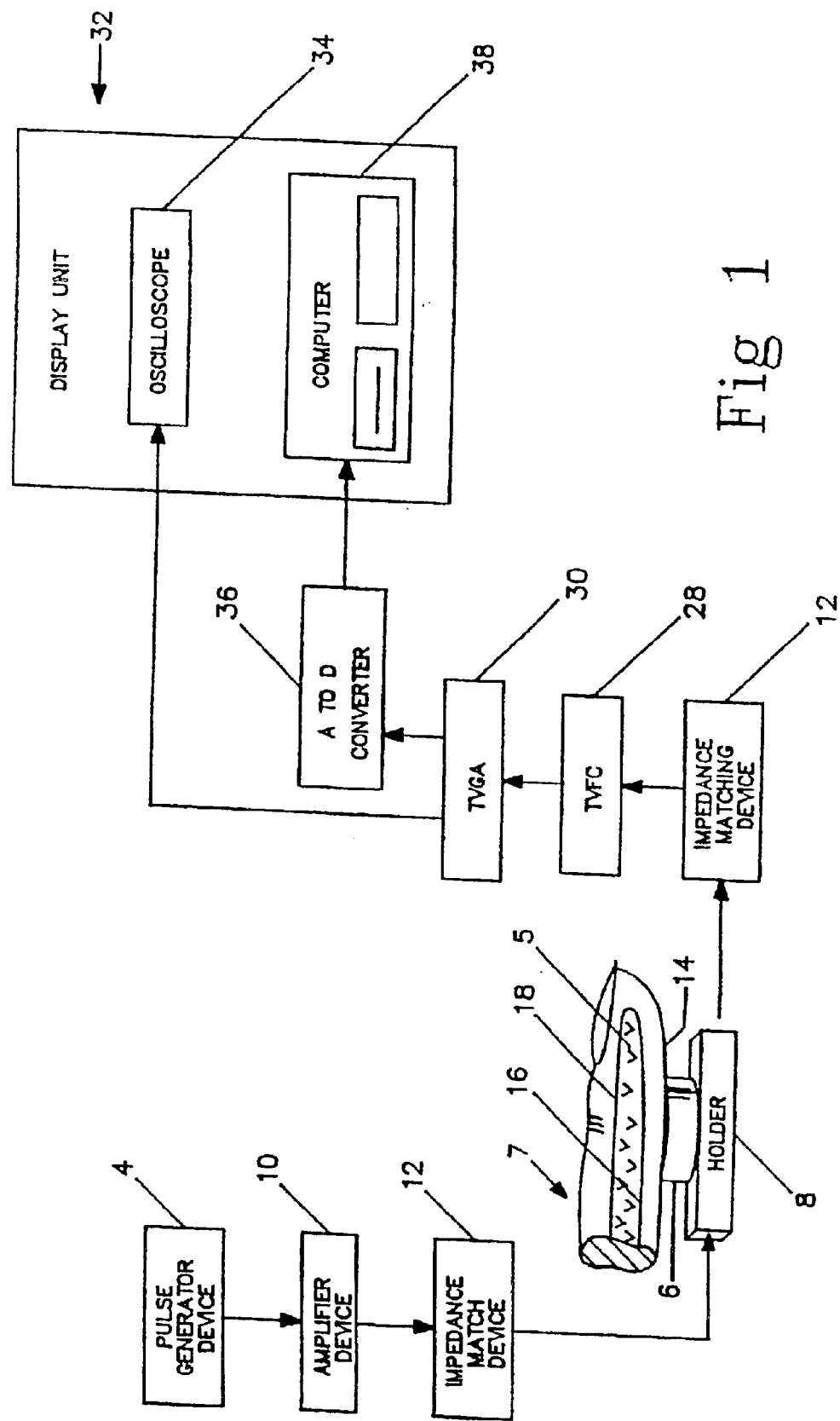
FIG. 1 is a schematic view showing in block diagram of the acoustic biometric recognition system of this present invention.

The system and method of the present invention is shown in FIG. 1. The most practical means of testing non-visible internal tissue is with a pulse method, although other methods, such as resonance may be used in this present invention. The basic principal of the pulse method comprises transmission of an acoustic energy pulse through an external accessible surface into the non-visible internal tissue with the subsequent emission of an acoustic energy pulse from within the tissue which has been altered by discontinuities and inhomogeneities within the tissue.

An electrical oscillating signal is generated by a pulse generator device 4. The pulse generator may be any type which generates a signal with predetermined characteristics; for example, frequency, mode, pulse duration or width and repetition rate. This device should generate a train of narrow pulses at a suitable pulse frequency ranging from about 100 KHz to about 10 MHz, preferably from about 500 KHz to about 5 MHz; with a pulse width of about 1 to about 10 microseconds, preferably from about 2 to about 4 microseconds; and from about 10 millivolts to about 500 volts in amplitude, preferably from about 1000 millivolts to about 300 volts. Any solid-state pulser may be used but preferably one having computer control of output voltage, damping, repetition rate, frequency, and pulse duration.

Several pulse generators meet the above requirements including: the BK Precision 2005A (100 kHz–450 MHz) (B&K Precision, Chicago, Ill.), the Tektronix SME02 (5KHz–5 GHz), and the Tektronix SME 4040 (0.5 Hz–20 MHz) (Tektronic, Inc., Beaverton, Oreg.), and the Matec 700 series (1–1100 MHz).

Utilizing the acoustic pulse method for investigation of non-visible internal tissue provides different choices including: pulse-echo, pitch-catch and through-transmission. The pulse-echo method involves the use of a single transducer which acts first as a transmitter of acoustic pulses and then as a receiver to detect emitted echoes reflected from defects or other interfaces within the scanned internal tissue. Pitch-catch method involves the use of two identical transducers, often, but not necessarily, mounted in the same holder, with one element serving to transmit acoustic pulses and the other to receive the reflected pulses. Through-transmission method involves the use of two transducers located relative to each other and to the specimen in such a manner that one transducer receives the energy transmitted from the other, however, only after the acoustic energy beam has passed through a region of interest. Any of these methods may be used in this biometric recognition system, preferably, the pulse-echo method.

The electrical oscillating signal generated in 4 is sent or transferred to a transmitting transducer 6 wherein the electrical oscillating signal is converted to a mechanical output in the form of an acoustic energy beam. Any electromechanical transducer that has the capability to convert the voltage pulse received from the pulse generator into an acoustic energy beam may be utilized in this present invention.

The most popular type of electromechanical transducers use the piezoelectric effect. The piezoelectric effect occurs in several natural and artificial crystals and is defined as a change in the dimensions of the crystal when an electric charge is applied to the crystal faces or vice versa. The importance of the piezoelectric effect and of the inverse effect, is that the piezoelectric material provides a means of converting electrical oscillations into mechanical oscillations and vice versa.

As the piezoelectric transducer is excited by a short electrical pulse, it will emit an acoustic pulse of length $\tau$ determined by its bandwidth ($\tau \Box 1/\Delta f$ where $\Delta f$ is the bandwidth of the transducer). Transducers used in pulse-type measurements, as in this present invention, need to be able to resolve separate echoes from two discontinuities located at only slightly different depths and this can only be accomplished with very short pulses, broadband width, and low Q transducers. The quantity Q for a transducer is defined as follows:

$$Q = \frac{f_0}{f_1 - f_2}$$

The Q of a transducer is a measure of the sharpness of resonance and, therefore, the operating frequency bandwidth of the transducer is a function of Q. Most piezoelectric elements usually have a high Q value and, as a result, a short electrical impulse will cause them to vibrate or "ring" for a long time. This is usually undesirable in a pulse-echo application, such as the present invention because the echo is received before the initial pulse dies down and its electrical indication becomes lost in the electrical indication of the initial pulse. To obtain low Q, broadband characteristics, the piezoelectric transducer is loaded on the non-radiating surface with a material having a high absorption characteristic and, thereby, causing a damping effect. The damping material preferably has the same characteristic impedance as the piezoelectric material.

Any commonly used piezoelectric material may be utilized in this present invention including: modified lead titanate, quartz, barium titanate, lithium sulfate, lead-zirconate-titanate, lead niobate and several polymeric materials, such as, poly-vinylidine fluoride. Examples of acoustic transducers which are commercially available and may be used in this present invention include: Matec broadband MIBO series (5–10 MHz), Matec broadband MICO (3.5 MHz), Matec broadband MIDO 2.25 MHz), and Matec broadband MIEC series (50 KHz–1 MHz).

The geometry of transducer 6 utilized in this present invention can be either circular or rectangular (linear arrays). The simplest geometry for the transducer, and preferably used in the present invention is a disk. A solid single disk can be either single phase or a composite. A disk type transducer requires only one signal channel but has limited focusing power. The focusing power can be improved either by shaping the transducer or adding an acoustic lens made of Perspex or epoxy resin. The transducer 6 diameter is normally at least about the equivalent of 10 wavelengths in order to produce a reasonably narrow beam. Scanning with a disk transducer is accomplished with mechanical motion, either linear or rotary.

A linear array of a plurality of transducers may also be used in this present invention. The advantage of using a linear array is that the transducers can be electronically phased to produce beams that sweep out a rectangular two-dimensional plane and requires no moving parts.

It is important to note that in using a piezoelectric transducer, or any other transducer as an acoustic generator, the output from a separate variable-frequency oscillator or signal generator does not have to be applied to the transducer. The transducer can actually be part of the oscillator circuit itself, and it is the chosen resonance frequency of the piezoelectric crystal which stabilizes the frequency of the electrical oscillations. Keeping this in mind any solid-state pulser or microprocessor can control damping and pulse duration in the present invention.

The design of the transducer is, of course, extremely important in order to get the maximum energy and efficiency from the vibrating system, but equally important is a suitable holder 8 to support the transducer 6. Once the transducer has had suitable leads connected to it for connecting to the signal generator 4, then it is ready for mounting. The most common type of mounting is to attach the back of the transducer to a solid support, usually referred to as a button. The button consists of a piece of material that is acoustically nonconducting and into which the transducer fits. The transducer 6 in the holder 8 can be held in the hand and moved slowly over the area of interest or can be driven by a motor to work out a pattern. When scanning through the external accessible surface into the non-visible internal tissue the transducer may be positioned normal to the surface and a single horizontal sweep may be sufficient. For a larger area of surveying, a horizontal sweep may be completed and then a vertical move of the transducer places the transducer in a position to complete another horizontal scan, thereby, surveying a predetermined area of the internal structure. Additionally, the transducer may be held in such a way that pivoting the transducer allows for a sweeping motion in at least a ninety degree arc in both the x and y direction. Also, the transducer may be placed on an angle to the external accessible surface thereby transmitting the acoustic energy beam at a predetermined angle.

An amplifier 10 may be placed between the electrical pulse generator 4 and the transducer 6. Any amplifier that can take a small input signal and make it larger without significantly altering the shape or frequencies of the signal may be utilized in this present invention. The amplifying device can contain several stages each of which multiply the output of the previous stage allowing a signal of millivolts to be amplified to many volts. The pulse generator 4 and amplifier 10 must provide a "sharp electrical pulse to excite the transducer 6. Accordingly, the transducer and amplifier should have similar broadband characteristics to avoid distorting the received signal. Also, the amplifier 10 can be turned on and off by a signal from the pulse generator whose rate is controlled by a synchronizer.

To obtain the maximum transfer of acoustical energy from the pulse generator 4 to the transducer 6 an impedance matching device 12 may be positioned between the pulse generator and the transducer thereby matching the acoustical impedance of each to the other as equally as possible. This problem of impedance matching, as it is termed, occurs in many branches of physics, and is employed in acoustical techniques as a means of matching two media of different acoustical impedances $R_1$ and $R_2$, respectively. The matching medium is sandwiched between the other two and should be the appropriate thickness relative to the wavelength of the acoustic energy beam transmitted, and its acoustical impedance R should be nearly equal to $\sqrt{(R_1 R_2)}$. Any impedance matching device that can match the acoustic impedance of the signal generator and transducer may be used in this present invention, and can include the commercially available Model 60, manufactured by Matec Instrumentation.

Coupling between the transducer 6 and the external accessible surface 14 of the non-visible internal tissue is important, in that, energy is not lost in irradiating soft tissue. Therefore, a means must be provided for transferring the acoustic energy between the transducer and the test object which in this case is the non-visible internal tissue of a thumb 7. Any coupling material may be used in this present invention that facilitates a maximum energy transfer across the transducer and external accessible surface interface. Basically, liquids can be used as a coupling medium for energy transfer between the transducer and test subject in the present invention. These can include direct contact between the transducer and test subject with a liquid or grease couplant between, immersion of the transducer and test subject in a liquid bath, or filling the gap between the transducer and test subject with a liquid-filled boot or thin films of a soft pliable polymer.

Figure 3:
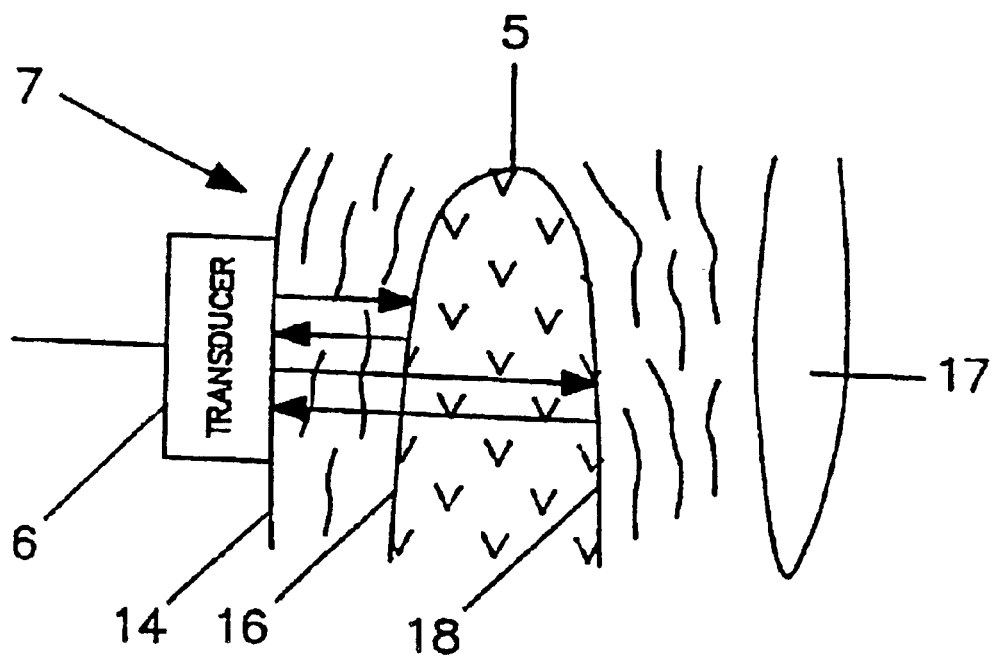
FIG. 3 is an enlarged side illustration of a thumb and internal bone surfaces corresponding to the amplitude peaks shown in FIG. 2.

As shown in FIG. 3, the pulse-echo method involves the use of the transducer 6 which acts first as a transmitter of acoustic pulses and then as a receiver of emitted acoustic pulses to detect echoes from defects or other interfaces within the non-visible tissue. The present invention uses transducers having a center or nominal frequency in the region from about 1 to about 5 MHz. It is preferred, however, to use frequencies from about 2 to about 4 MHz. The generated acoustic energy beam passes through the external accessible surface 14 of the thumb 7 into the non-visible internal tissue. The acoustic energy beam is reflected by discontinuities which are caused by interfaces between different mediums having different acoustic impedance values and any inhomogeneity in the macrostructure containing different types of tissues in the thumb. The principle of reflection of acoustic energy from boundary interfaces between different mediums, such as bone and soft tissue 16, which exhibit different acoustic impedances provides a basis for recognition of an individual's non-visible internal tissue having a unique distinguishing characteristic.

Tissues and organs of different persons or animals have been found to differ from one another in the number of reflected signals and in the amplitude of these signals. Accordingly, this present invention utilizes this fact by examining different types of tissue including: skeletal tissue, fat deposits, cartilage, organs, muscle tissue, soft tissue, blood vessel, and nervous system tissue and using the emitted signals as a biometric recognition method and system.

It is known that healthy tissue can be distinguished from pathological tissue because of the structural differences in the tissue layers. For instance, cancerous tissue contains more reflecting surfaces than normal tissue or benign neoplasms. These differences in tissue are due to a structural change in the DNA of the malignant cell which causes a variation in the tissue morphology whether it is due to increased fluids or density of tissue.

It is also known that unique distinguishing characteristics, such as fingerprints, hand geometry, facial and cranial dimensions, voice patterns, or blood vessel arrangements are determined by one's unique genetic makeup. A person's unique DNA predetermines all of the above and every other biological feature and mechanism of that individual. Without question, the outwardly manifested differences in individuals also extend to non-visible internal features and tissues, such as skeletal tissue which is one of the sources of identification in the present invention.

On a macro scale, bones have a variety of features and structures. They have elevations, such as lumps or bumps; elongated and narrow projections; grooves or canals on the bone surface; and holes or canals through the bone. Also, on a micro scale there are a variety of different structures which include three types of bone tissue. Based on morphology these types include: cortical, cancellous and subchrondal. Cortical bone is the common type found on the external surface of skeletal elements. This type of bone has few pores or spaces. Cancellous bone is filled with pores and spaces. The spaces are filled with tissue that produces red blood cells. Subchrondal bone is notable for an abundance of microscopic vascular canals piercing its surface. These canals carry the blood vessels, that in life nourish the deeper parts of certain types of cartilage.

Bone is a two-phase composite substance made up of two very different materials. Such substances are called anisotropic, meaning that they have two different sets of properties. The two major components of bone are the organic phase and an inorganic or mineral phase consisting primarily of the bone mineral hydroxyapatite:

$$Ca_{10}(PO_4)_6(OH)_2.$$

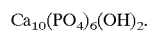

The crystals of hydroxyapatite, as they appear in bone are not perfect. Many discontinuities are formed within the structure of a single crystal as it grows. Others form with time. At the surface of the discontinuities, which are irregular and occur at random, impurities may exist. In fact, if such impurities are of sufficient magnitude, they may be the cause of the discontinuity.

Discontinuities in the bone mineral are not limited to the interior of the crystals. The crystals themselves are discrete, and the spaces between the crystals are filled with organic matrix, water, and solid constituents not included in the crystal structure. If the bone is considered, with the water and organic material removed, it resembles a brick wall with a pattern peculiar to itself and individualized for each human or animal. This is because each individual's hormonal responses influence the individuality of bone growth and any subsequent repair mechanism thereof. The six main hormones which exert primary effects on bone growth are calcitonin, growth hormone, thyroid hormone, parathyroid hormone, sex hormone and glucocorticoids. Hormonal and subsequent enzymatic responses are all ultimately determined and controlled by one's DNA. Therefore, bone structure, both on a micro scale and macro scale, is merely a demonstration of a body's unique response to the control and mechanism of one's unique DNA. Accordingly, bone shape, surface irregularities, mechanical properties and strength depend on the structure of the specific bone and exhibit unique individual differences. Keeping this in mind, bone structure including its density, porosity, geometric shape, thickness, and surface discontinuities are unique to each individual or animal, and therefore, can be utilized as a unique distinguishing characteristic for identification and/or verification in the biometric recognition methods or systems of the present invention.

Thus understood, when skeletal tissue is investigated with acoustic energy the subsequently emitted acoustic beam which is either reflected off the internal structure, or transmitted through the tissue will show the effect of interaction with an individual's unique discontinuities, abnormalities and/or characteristics. After the acoustic energy beam is emitted from the non-visible internal tissue the beam is detected by a receiving transducer 6 shown in FIG. 1. As stated earlier, in the pulse-echo method, the same transducer that transmits the acoustic pulse is also the receiving or detecting transducer for the emitted acoustic pulse.

At a physical flaw in a medium or at boundaries between different mediums having different acoustical impedance, such as bone and soft tissue 16 as shown in FIG. 3, there is likely to be an acoustical discontinuity which will reflect acoustic waves. The pulse-echo method relies on the acoustic impedance of differing tissues since even a small impedance difference in the tissue will give an acceptable echo. Acoustic impedance is dependent upon compressibility and density of each individual material. The interface between different mediums; for example, subcutaneous tissue and bone, reflects acoustic energy beams and can provide information, such as the thickness of subcutaneous tissue. When performing a "boneprint" the high acoustic impedance of bone will act as a reflecting surface and provide good acoustic echoes, thereby defining characteristics of the bone surfaces and tissue positioned between the transducer and bone.

When scanning bone tissue with acoustic energy beams consideration should be given to the differences between cortical and cancellous bone especially if determining elastic properties. Elastic properties, k, are related to density, p, and the velocity of wave propagation, v. The relationships are of the general form:

$$k = pv^2$$

When scanning cortical bone, having some porosity, frequencies between about 2 MHz to about 10 MHz are most useful because these relatively high frequencies allow accurate determination of the time delay due to propagation through cortical specimens. The more porous structure of cancellous bone requires lower frequency waves ranging from about 100 to about 1000 KHz.

Figure 2:
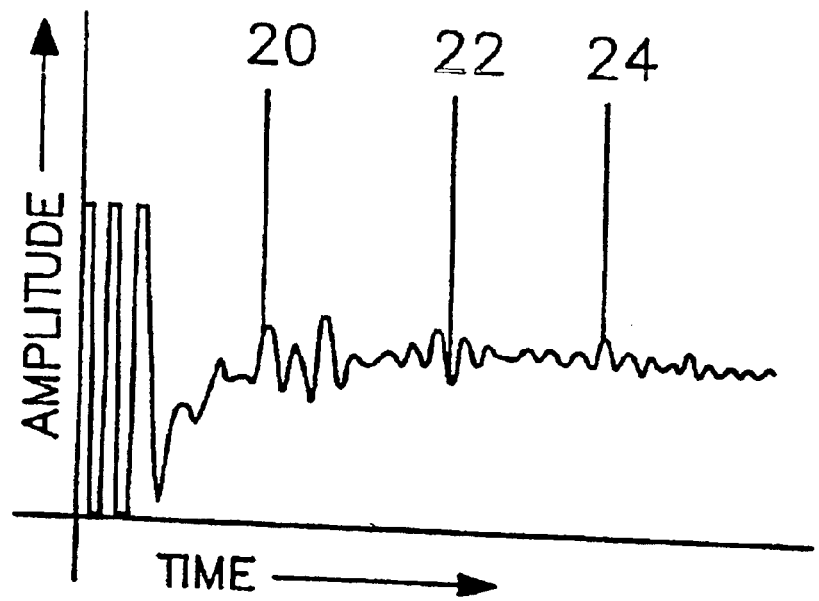
FIG. 2 is an A-scan illustrative of an amplitude versus time plot.

If a pulse of acoustic energy is transmitted into a medium from the transducer, the time taken for this pulse to travel from the transducer to a discontinuity and back will give a measure of the distance of the discontinuity provided that the acoustic velocity of the medium is known. In FIGS. 2 and 3, an amplitude versus time plot known as an A-scan shows echo reflections from the front-16 and back-surface 18 of the bone that may provide measurement information. Assuming that the velocity in the non-visible tissue of the thumb is known, the measurement of the time interval between front-surface echo 20 and back-surface echo 22 enables the thickness of the bone 5 to be calculated. The back-surface echo 22 will be followed by a train of further echoes 24 corresponding to the surface of the fingernail 17 and successive double transits of the thumbs thickness. Additionally, the distance to the surface of the bone can be estimated from the relative position of the echo peaks on the scan. Also, the amplitude of the echo peaks can give an indication of the size of the discontinuity. Some of the types of discontinuities which can be investigated in the present invention comprise dislocations in the bone crystals, canals or ridges on bone surfaces, and differences in density in the bone.

The high acoustic velocity and attenuation in bone is accompanied by a relatively large dispersion and believed to be associated with scattering. To improve the signal from the receiving transducer 6, it may be corrected by compensating for any attenuation of the acoustic wave in the tissue which may alter the signal. Attenuation is considered the sum of the absorption and all processes relegated to scattering. When acoustic waves travel into the tissue, high frequency components are absorbed more than low frequency because absorption is proportional to frequency. Therefore, the loss of amplitude of the wave and the loss of high frequency signal component with increased depth may be corrected with the use of a time-variable gain amplifier 30 and time-variable filter circuit 28 positioned between the receiving transducer 6 and a display unit 32 as shown in FIG. 1.

The time-variable gain amplifier 30 corrects the loss in amplitude by correcting with amplification proportional to the depth in the tissue at which the echo occurred. Any upper limit may be set to maintain amplitudes at nearly the same level over different depth ranges. The preferred upper decibel (dB) gain level is about 65 dB. The time-variable filter circuit 28 increases the gain for high frequency signal which comes from deeper in the tissue.

It has been found that generating and transmitting a substantially non-attenuating frequency in internal tissue is most effective in this present invention. This is accomplished by using longitudinal ultrasound waves with multiple frequencies in the region from about 100 KHz to about 5 MHz, preferably from about 1 to 3 MHz.

Forming a representative pattern is the function of the display unit 32 wherein either an oscilloscope 34 or a microprocessor 38 or a combination of both can provide an amplitude versus time plot. Interfacing the emitted electrical signal from the receiving transducer 6, in FIG. 1, with a digital system and/or a microprocessor 38 can quickly compute large quantities of data. However, to realize the advantages of digital electronics, it is necessary to convert the analog signal to a digital form with an A to D device 36. Any analog to digital converter device that changes an analog signal into a collection of bits by measuring the amplitude of the analog signal and then expressing that amplitude as a binary number may be used in the present invention.

The emitted acoustic beams can be displayed on the oscilloscope 34 after they have been converted by the receiving transducer 6 into the emitted electrical signal. Any oscilloscope may be utilized in this invention to amplify, measure and provide a visual output for observing an electrical signal caused by rapidly changing voltages or currents. The representative pattern, in visual form, comprises an amplitude (vertical) versus time (horizontal) plot as shown in FIG. 2, wherein the amplitude of the echo peaks is in response to received signal voltage or current. This plot of reflected echo peaks exhibits the interaction of the transmitted acoustic beam with the non-visible internal tissue having unique structure and surfaces. The settings of the oscilloscope may be adjusted so that front-surface echo reflection 20 as shown in FIG. 2 is indicated at the left side of the oscilloscope screen, and the back-surface reflection 22 occurs at the right side of the oscilloscope screen with reflections from discontinuities within the test material occurring between the front- and back-surface reflections.

In order to have a sine wave displayed on the oscilloscope screen each sweep should begin at an identical place on the wave. Therefore, the signal has to be synchronized. This can be realized by mixing a portion of the test pulse signal with the sweep signal in the oscilloscope in such a way as to produce a voltage spike. This spike serves to trigger the sweep, and thus, the waveform can be observed as a continuous image on the screen. If it is desirable to delay the pulse after the start of the sweep, the signal from the sweep can be used to actuate a suitable delay circuit, which may be fixed or variable. The delay circuit will produce another signal, after a suitable time delay, which performs the function of triggering the pulse.

The spectrum of the emitted electrical signal presents valuable information relating to the uniqueness of an individual's boneprint. Careful investigation of the emitted electrical signal provides the basis for comparative analysis. Mathematical manipulation of data gathered from the amplitude plot can transform the amplitude plot into numerical form that can easily be compared with master representative pattern in numerical form. Any mathematical algorithms that can reduce the information contained in the amplitude versus time plot to specific values may be used. It is preferred, however, to utilize the algorithm outlined in the flowchart of FIG. 4. The flowchart analyzes the reflection echo peaks of an A-scan and calculates specific numerical values that define the representative pattern of the non-visible unique distinguishing characteristic. These calculations may be performed manually or for a large group of system participants, a computer may be utilized.

Figure 5:
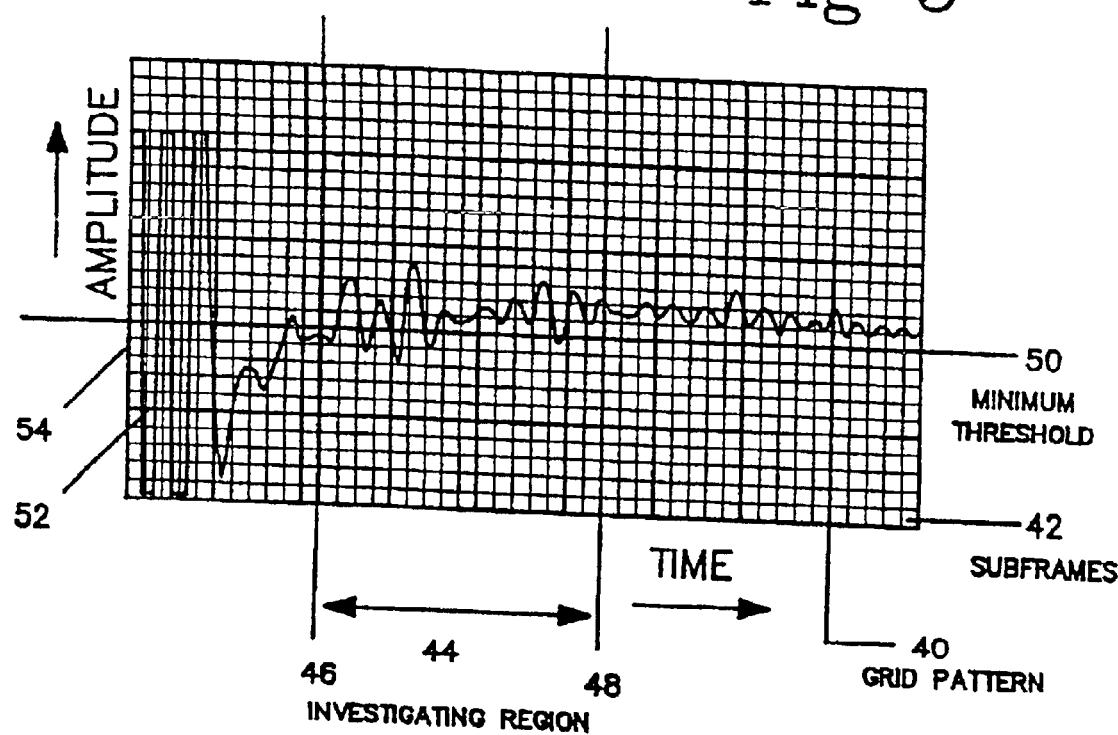
FIG. 5 is the amplitude versus time plot of FIG. 2 showing the subdivisions of the A-scan for analyzing data outlined in the flowchart of FIG. 4.

Firstly, the amplitude versus time plot, as shown in FIG. 5, is divided into a square grid pattern 40, wherein the grid pattern is further subdivided into a plurality of square subframes 42. The subframes can be subdivided even further because the smaller the final grid pattern the more precise the data values will become. Each of the subframes are assigned an integer starting with the lowest value in the bottom left corner of the plot. The value of the integers increase horizontally across the plot moving vertically up one subframe and repeating across the plot until all the subframes have been assigned a value.

Then at least one investigating region 44 is selected containing the echo peaks of interest having boundaries 46 and 48 parallel to the y-axis and normal to the x-axis of the plot. The echo peaks of interest usually include at least the front- and back-surfaces of the non-visible internal tissue being scanned which in this particular method includes the phalanx bone in the thumb of a participant. A minimum amplitude threshold level value 50 is determined, parallel to the x-axis and normal to the y-axis, thereby dividing the plot into a selecting 52 and eliminating 54 area. Echo peaks that extend above the minimum threshold level are selected for later analysis and echo peaks below this level are eliminated from further analysis. The selected peaks are now analyzed in light of their respective height and interpeak distance between peaks.

The interpeak distance between the center of each selected peak is determined by first measuring the exact distance of the investigating region along the x-axis, having a value quantified by the number of subframes, whereby the smaller integer assigned to the sub-frame on one boundary 46 is subtracted from the larger integer on the other boundary 48. This will give the maximum possible distance between selected echo peaks.

The center of each selected peak within the region of investigation is determined. Then the actual interpeak distance between the center of each selected peak is measured having a value quantified by the amount of included subframes. A ratio of each actual interpeak distance over the maximum distance of the investigating region is computed for each interpeak distance. The ratio is converted to decimal form. The average mean interpeak distance and applicable standard deviation are calculated using statistical methods wherein the average mean is:

$$\bar{x} = \frac{\sum x}{n}$$

and the standard deviation is:

$$s^2 = \sqrt{\frac{\sum (x - \bar{x})^2}{n - 1}}$$

The calculated interpeak distance average mean, and standard deviation are saved for later comparison.

The height of each selected peak in the investigating region is determined by measuring the vertical distance of each peak having a value quantified by the amount of subframes that extend above the minimum threshold level value 50, whereby the smaller integer assigned to the sub-frame positioned on the minimum threshold level 50 is subtracted from the larger integer at the apex of the peak. These values are also saved and stored as master files.

This routine is performed on every individual scan and all data stored for later comparison use.

During reentry into the system an individual is again scanned and the new data is compared with data from master representative patterns of other participants. Many comparative algorithms are available, but a preferred algorithm involves calculating the Euclidean distance for the sum of interpeak distance average mean value, standard deviation value and height value of each selected peak of the unknown and the respective values of each master file of participants previously saved and stored. For instance, let $a_{mi}$ and $a_{ui}$ be the value of the i-th feature of the master file and the unknown file, respectively, such as the height value for the final selected peak. The Euclidean distance, d, between the values found in a master file and unknown file is:

$$d^2 = \sum_{i}^{n} (a_{mi} - a_{ui})^2$$

The Euclidean distance, is a measure of the similarity of values found in a master file and values of the unknown. If the values from the unknown representative pattern are the same as a set of values found in a specific master representative file, then the Euclidean distance will approach zero and the person or animal will be identified because of a match. If there is not an exact match the computer will look for the closest match and determine if the match is acceptable within a predetermined confidence level. If there is a match, then the identity is verified, if not, the individual is rejected.

The following example serves to illustrate the invention but is not to be construed as limiting the scope.

EXAMPLE 1

An experiment was performed to show that identification, and therefore, verification of an individual could be determined with the use of representative patterns of non-visible internal tissue having distinguishing characteristics unique to that individual. Numerous adults, having fully developed bone structures were used as test subjects. The testing of these adults included taking a representative "boneprint" from the palmar tip of their right thumb. The master representative patterns were compared to an unknown current representative pattern from one of the individuals, and subsequently used to verify the identity of the unknown individual.

Master representative patterns were first produced for each individual in the test using the system assembled and shown in FIG. 1. The pulse-echo method was utilized by generating an electrical signal having a frequency about 2.25 MHz, with pulse repetition rate of one every 10 msec, a pulse width of 2 μsec and 150 volts in amplitude. The pulsed electrical signal was sent to a Matec (CF204HR) transducer having a diameter of 12.5 mm and a nominal resonant frequencies of 2.25 MHz. EKG gel was used as coupling material between the thumb of each test subject and the transducer for impedance matching. The same transducer was used for both transmitting the acoustic energy beam and receiving the emitted acoustic energy beam. The emitted electrical signal, after conversion by the receiving transducer from the emitted acoustic energy beam, was sent to both an oscilloscope for an A-scan plot tracing and also converted from analog to digital for processing in a microprocessor. An amplifier was used to correct the loss of amplitude proportional to the depth from which the echo came and for high frequencies as the signal came from deeper in the tissue.

Figure 6:
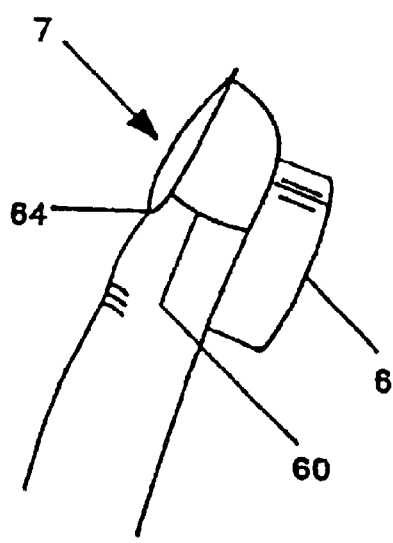
FIG. 6 is an enlarged illustration of the medial side of a right thumb indicating the starting point of a horizontal single scan.
Figure 7:
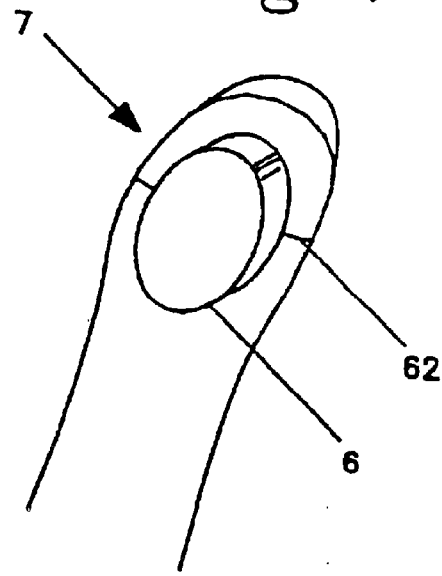
FIG. 7 is an enlarged illustration of the palmar side of a thumb indicating the path of a completed horizontal single scan.

As shown in FIGS. 6 and 7, a single line scan by the single Matec transducer commenced at the medial surface 60 of the right thumb 7 and the transducer was moved incrementally in a 180° arc across the palmer surface 62 of the thumb to the lateral side, with the bottom edge of the transducer 6 aligned with the proximal edge of the thumbnail. The number of scans varied from 25 to 40.

Figure 4:
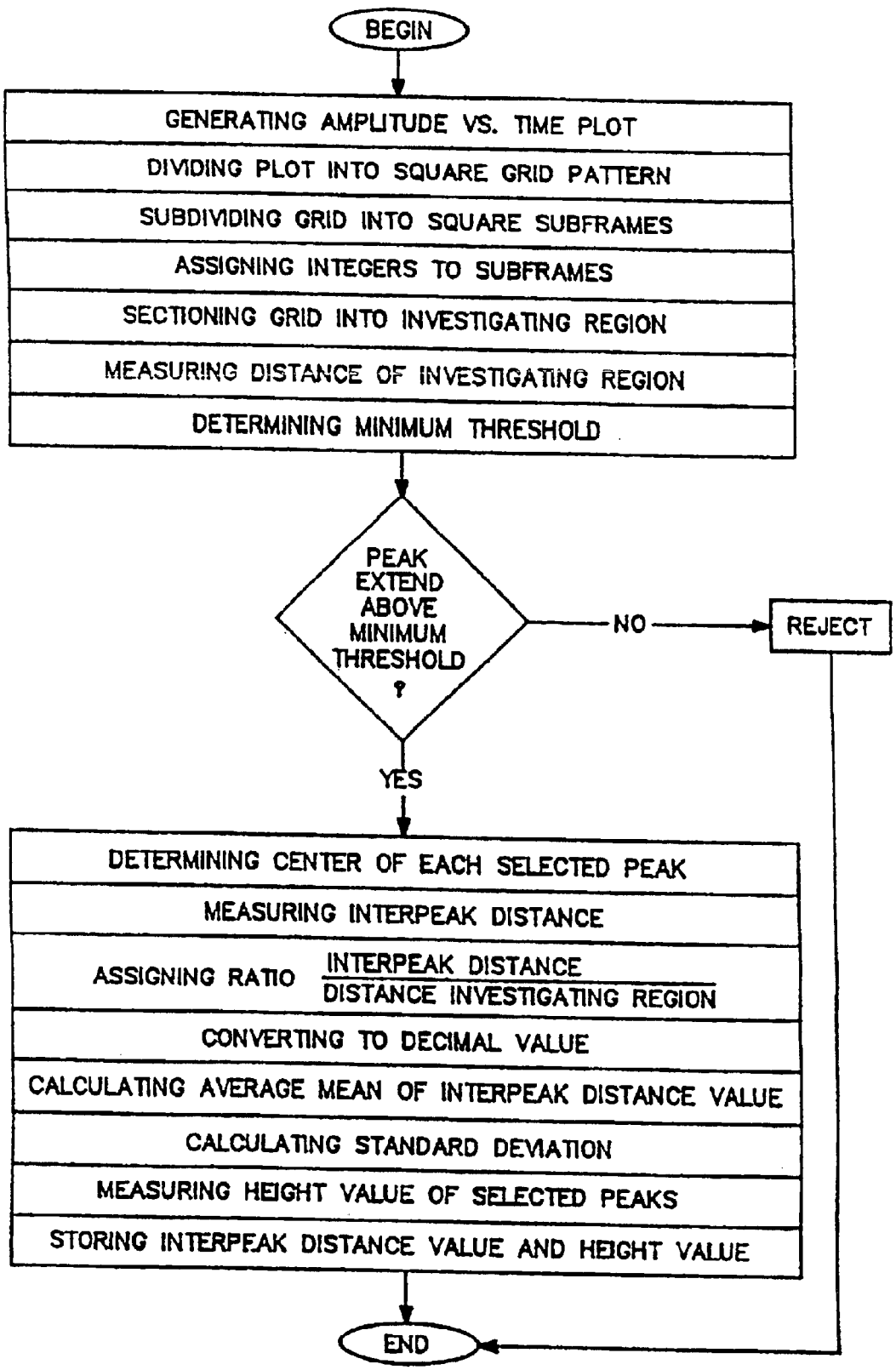
FIG. 4 is a flowchart outlining an algorithm useful in analyzing data from an amplitude versus time plot to form a representative pattern.

The emitted electrical signal was displayed on the oscilloscope as an amplitude versus time plot and a hardcopy tracing was analyzed manually according to the calculations outlined in the flowchart of FIG. 4. Also, the data was converted from analog to digital mode and saved in an IBM/PC microprocessor for further processing. The IBM/PC microprocessor further converted the digital signal back to analog to provide a hardcopy of the amplitude plot. Also the data was analyzed using Mathematica, a commercially available mathematics and waveform analysis program which basically resolved the plots into an acoustic picture in hardcopy form for each "boneprint". The waveform data was further analyzed according to the algorithm outlined in the flowchart of FIG. 4 and saved.

Two days later, one of the individuals was called back to have a current representative scan performed. This was the unknown who was identified by comparison with the previously produced master representative patterns. The same procedure for the scanning was repeated, limited to a single scan and the current representative pattern was analyzed by the waveform method, including the height and interpeak distance of selected amplitude peaks outlined in FIG. 4. The unknown individual was easily identified and verified by a comparison with the saved data of the master representative patterns. The identification of the individual was verified by recognizing the unique distinguishing characteristic of the individual's "boneprint".

What is claimed is:

1. A non-invasive method of recognizing the identity of a human or animal by recognizing non-visible internal tissue having a substantially stable unique distinguishing characteristic comprising the following steps:
   a) generating an electrical oscillating signal;
   b) converting said electrical oscillating signal of step (a) to an acoustic energy beam, said acoustic energy beam having at least one frequency in the range between 100 KHz and 10 MHz;
   c) transmitting said acoustic energy beam through an external accessible surface to said non-visible internal tissue;
   d) receiving an emitted acoustic energy beam from said non-visible internal tissue, said emitted acoustic energy beam responsive to said transmitted acoustic energy beam;
   e) converting said emitted acoustic energy beam to an emitted electrical signal;
   f) forming a current representative pattern of said non-visible internal tissue having said substantially stable unique distinguishing characteristic in response to said emitted electrical signal, said forming of said current representative pattern comprising:
      (i) generating at least one amplitude versus time plot, wherein the amplitude and interpeak distance of an echo peak is in response to said emitted electrical signal;
      (ii) determining a minimum threshold amplitude value parallel to an x-axis and normal to a y-axis of said plot, thereby dividing said plot into selecting and eliminating areas;
      (iii) calculating at least one ratio of said peaks in the selecting area to provide a representative pattern; and
   g) comparing a previously produced and stored master representative pattern of said non-visible internal tissue with said current representative pattern of same.

2. The method of claim 1, wherein said acoustic energy beam comprises at least one frequency which is substantially non-attenuating in internal tissue.

3. The method of claim 1, wherein step (b) and step (c) are performed by a transmitting transducer.

4. The method of claim 3, wherein step (d) and step (e) are performed by a receiving transducer.

5. The method of claim 4, wherein said transmitting transducer and said receiving transducer comprise the same transducer.

6. The method of claim 1, wherein said acoustic energy beam comprises at least one frequency from about 1 MHz to about 5 MHz.

7. The method of claim 1, wherein said non-visible internal tissue comprises at least one medium.

8. The method of claim 5, wherein said transmitting through accessible surface comprises positioning said same transducer on said external accessible surface and transmitting said acoustic energy beam substantially normal to said non-visible internal tissue.

9. The method of claim 8, wherein said non-visible internal tissue comprises at least one member selected from the group consisting of skeletal tissue, fat tissue, cartilage, organs, muscle tissue, soft tissue, blood vessels, and nervous system tissue.

10. The method of claim 8, further comprising sweeping said same transducer in a horizontal direction and moving vertically a short distance after each horizontal sweep repeating until a survey of a predetermined portion of said external accessible surface is completed.

11. The method of claim 5, wherein said transmitting through external accessible surface further comprises contacting said same transducer with said external accessible surface and sweeping said transmitting and receiving transducer in at least a ninety degree arc in both the x direction and y direction.

12. The method of claim 1, wherein said non-visible internal tissue comprises skeletal tissue.

13. The method of claim 1, wherein said forming current representative pattern further comprises:
   a) dividing the amplitude versus time plot into a substantially square grid pattern;
   b) subdividing said square grid pattern into a plurality of square subframes;
   c) assigning an integer to each said square subframes;
   d) sectioning said amplitude versus time plot into at least one investigating region containing echo peaks of interest, wherein boundaries of said investigating region are parallel to the y-axis of said plot and normal to the x-axis;
   e) measuring distance of said investigating region included within said boundaries having a value quantified by the number of subframes;
   f) determining the center of each said selected echo peak in said investigating region;
   g) measuring interpeak distance, parallel to the x-axis, between said centers of each said selected echo peak having a value quantified by the number of subframes;
   h) assigning a ratio value for each of said interpeak distances wherein said measured value in subframes in said interpeak distance is compared to said measured value in subframes included in said investigating region;
   i) converting said ratio value to a decimal representing said interpeak distance;
   j) calculating the average mean of said interpeak distance of all selected echo peaks;
   k) calculating the standard deviation of said average mean;
   l) measuring a height value for each of said selected echo peaks above the minimal threshold value having a value quantified by the number of subframes; and
   m) storing said average mean of said interpeak distances and said height values of said selected echo peaks.

14. The method of claim 13, wherein said master representative pattern is produced utilizing the same method for forming said current representative pattern.

15. The method of claim 13, wherein said generating at least one amplitude versus time plot comprises;
   converting said emitted electrical signal from analog mode to digital mode; and
   electronically computing said amplitude versus time plot responding to said digitally converted emitted electrical signal.

16. The method of claim 13, wherein said generating at least one amplitude versus time plot comprises:
   providing a visual output for observing an electrical signal caused by rapidly changing voltages or currents.

17. The method of claim 1, wherein said master representative pattern is replaced with said current representative pattern after at least one positive verification of said person or animal.

18. The method of claim 1, wherein said generated electrical signal is in a pulse mode.

19. The method of claim 1, wherein said emitted acoustic energy beam is in response to the interaction of the transmitted acoustic energy beam with any discontinuities and inhomogeneities within the non-visible internal tissue.

20. A non-invasive method of verifying the identity of a human or animal by recognizing non-visible internal tissue having a substantially stable unique distinguishing characteristic comprising the following steps:
   a) producing a master representative pattern of said non-visible internal tissue having said substantially stable unique distinguishing characteristic;
   b) storing in at least one memory storage system said master representative pattern of said non-visible internal tissue;
   c) generating an electrical oscillating signal;
   d) sending signal of step (c) to at least one transmitting transducer wherein said signal is converted to an acoustic energy beam;
   e) transmitting said acoustic energy beam from said transmitting transducer through an external accessible surface to said non-visible internal tissue wherein said transmitting acoustic energy beam before being emitted is altered by interaction with discontinuities and inhomogeneities within said non-visible internal tissue;
   f) receiving said emitted acoustic energy beam from said non-visible internal tissue with at least one receiving transducer wherein said emitted acoustic energy beam is converted to an emitted electrical signal;
   g) forming a current representative pattern of said non-visible internal tissue having said unique distinguishing characteristic in response to said emitted electrical signal, said forming of said current representative pattern comprising:
      (i) generating at least one amplitude versus time plot, wherein the amplitude of an echo peak is in response to said emitted electrical signal;
      (ii) determining a minimum threshold amplitude value parallel to the x-axis and normal to the y-axis of said plot, thereby dividing said plot into selecting and eliminating areas; and
      (iii) eliminating said echo peaks below said minimum threshold amplitude value, leaving only selected echo peaks; and
   h) comparing said stored master representative pattern of said non-visible internal tissue with said current representative pattern of same.

21. A system for verifying the identity of a human or animal by recognizing non-visible internal tissue having a substantially stable unique distinguishing characteristic comprising the following steps:
   a) a means for generating an electrical oscillating signal;
   b) at least one transmitting transducer connected to element (a) for converting said electrical oscillating signal to an acoustic energy beam thereby transmitting said acoustic energy beam through an external accessible surface to said non-visible internal tissue wherein said transmitting acoustic energy beam is altered by interaction with discontinuities and inhomogeneities within said non-visible internal tissue before being emitted;
   c) at least one receiving transducer for converting said emitted acoustic energy beam from said non-visible internal tissue to an emitted electrical signal;
   d) a means for forming a current representative pattern, wherein said emitted electrical signal received from element (c) is transformed into a current representative pattern of said substantially stable unique distinguishing characteristic, said forming of said current representative pattern comprising:
(i) generating at least one amplitude versus time plot, wherein the amplitude of an echo peak is in response to said emitted electrical signal;
(ii) determining a minimum threshold amplitude value parallel to the x-axis and normal the y-axis of said plot, thereby dividing said plot into selecting and eliminating areas; and
(iii) eliminating said echo peaks below said minimum threshold amplitude value, leaving only selected echo peaks; and
e) a means for comparing connected to element (d), wherein said current representative pattern is compared with a previously produced and stored master representative pattern of same.

22. The system of claim 21, wherein the elements (b) and (c) comprises the same transducer.

23. The system of claim 22, further comprising a means for holding said transducer.

24. The system of claim 22, wherein said same transducer transmits said acoustic energy beam having a frequency from about 1 MHz to about 5 MHz.

25. The system of claim 21, wherein said non-visible internal tissue comprises at least one member selected from the group consisting of skeletal tissue, fat tissue, cartilage, organs, muscle tissue, soft tissue, blood vessels, and nervous system tissue.

26. The system of claim 21, wherein said master representative pattern is produced utilizing the same means for forming said current representative pattern.

27. The system of claim 21, wherein said microprocessor generates said current representative pattern from said emitted electrical signal received from element (c) comprising the following steps:
a) generating at least one amplitude versus time plot, wherein the amplitude of an echo peak is in response to said emitted electrical signal;
b) dividing the amplitude versus time plot into a square grid pattern;
c) subdividing said square grid pattern into a plurality of square subframes;
d) assigning an integer to each said subframes;
e) sectioning said amplitude versus time plot into at least one investigating region containing echo peaks of interest, wherein boundaries of investigating region are parallel to the y-axis of said plot and normal to the x-axis;
f) measuring distance of said investigating region included within said boundaries having a value quantified by the amount of subframes;
g) determining a minimum threshold amplitude value parallel to the x-axis of said plot thereby dividing said plot into selecting and eliminating areas;
h) eliminating said echo peaks below said minimum threshold amplitude value leaving only selected echo peaks in said investigating range;
i) determining center of each said selected echo peak in said investigating region;
j) measuring interpeak distance, parallel to the x-axis, between said centers of each said selected echo peaks having a value quantified by the amount of subframes;
k) assigning a ratio value for each of said interpeak distance wherein said measured value in subframes in said interpeak distance is compared to said measured value in subframes included in said investigating region;
l) converting said ratio value to a decimal representing said interpeak distance;
m) calculating the average mean of said interpeak distance of all selected echo peaks;
n) calculating the standard deviation of said average mean;
o) measuring a height value for each of said selected amplitude peak above the minimal threshold value having a value quantified by the amount of subframes; and
p) storing said average mean of said interpeak distance and said height value of said selected amplitude peak.

28. The system of claim 23, wherein said same transducer is positioned on said the external accessible surface whereby said transmitting acoustic energy beam is transmitted substantially normal to said non-visible internal tissue.

29. The method of claim 1, wherein said acoustic energy of said acoustic energy beam has a frequency of between about 100 KHz and about 10 MHz.

30. The method of claim 1, wherein said acoustic energy of said acoustic energy beam has a pulse width of between about 1 and about 10 microseconds.

31. The method of claim 1, wherein said electrical oscillating signal has an amplitude of between about 10 millivolts and about 500 Volts.

32. The method of claim 1, wherein said generated acoustic energy comprises a transmission mode selected from the group consisting of pulse-echo, pitch-catch, and through.

33. The method of claim 1, wherein said acoustic energy of said acoustic energy beam comprises ultrasonic waves.

34. The method of claim 33, wherein said ultrasonic waves include longitudinal waves.

35. The method of claim 3, wherein said transmitting transducer comprises a low value of Q.

36. The method of claim 3, wherein said transmitting transducer is loaded on a non-radiating surface within a material comprising a high absorption characteristic.

37. The method of claim 3, wherein said acoustic energy beam is capable of being focused.

38. The method of claim 3, wherein said transmitting transducer features a scanning capability by means of mechanical motion.

39. The method of claim 38, wherein said mechanical motion comprises at least one motion selected from the group consisting of linear and rotary motion.

40. The method of claim 3, wherein said transmitting transducer has a nominal frequency in a range of about 1 to about 5 MHz.

41. The method of claim 1, further comprising a means for amplifying said electrical oscillating signal.

42. The system of claim 21, further comprising a means for impedance matching between said transmitting transducer and said electrical oscillating signal means.

43. The system of claim 21, further comprising a coupling medium between said transmitting transducer and said external accessible surface.

44. The method of claim 13, wherein said amplitude versus time plot comprises an "A-scan".

45. The method of claim 41, wherein said means for amplifying comprises a time-variable gain amplifier.

46. The method of claim 45, further comprising a time-variable filter circuit.

47. The method of claim 1, wherein said acoustic energy of said acoustic energy beam comprises multiple frequencies.

* * * * *